No. 886,244. PATENTED APR. 28, 1908.
R. PICARD.
FARE INDICATOR FOR CARRIAGES.
APPLICATION FILED NOV. 21, 1905.
3 SHEETS—SHEET 1.
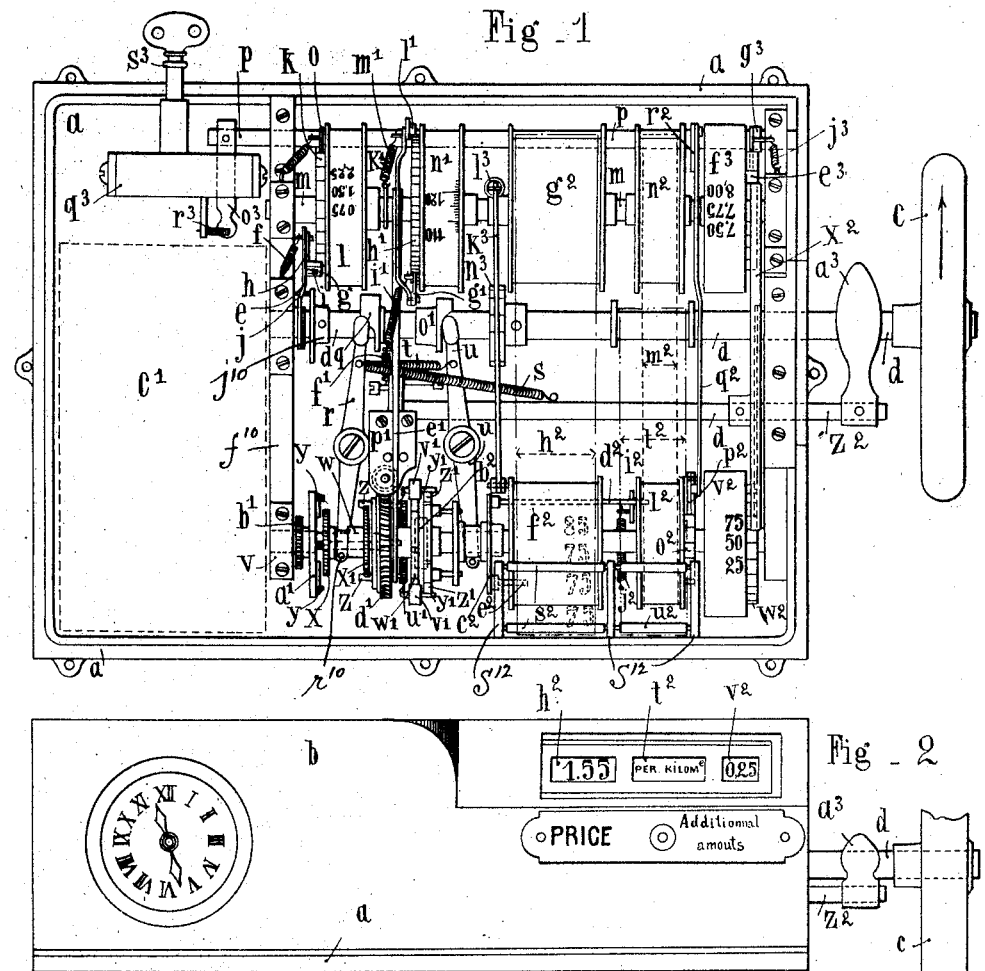

No. 886,244. PATENTED APR. 28, 1908.
R. PICARD.
FARE INDICATOR FOR CARRIAGES.
APPLICATION FILED NOV. 21, 1905.
3 SHEETS—SHEET 2.
Fig. 6
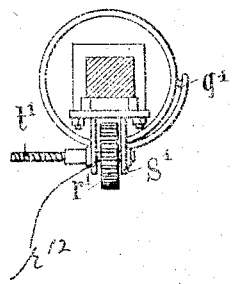
Fig. 7
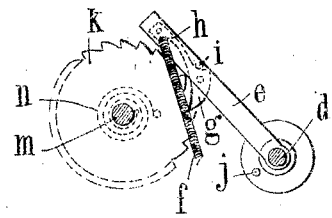
Fig. 17
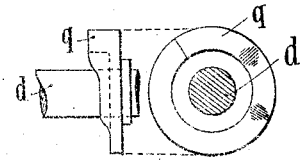
Fig. 8
Fig. 9
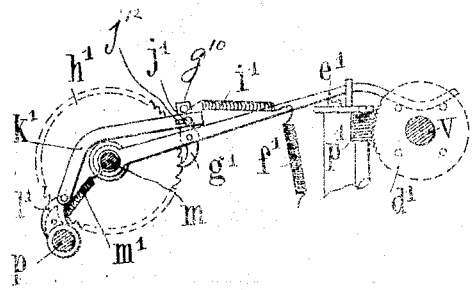
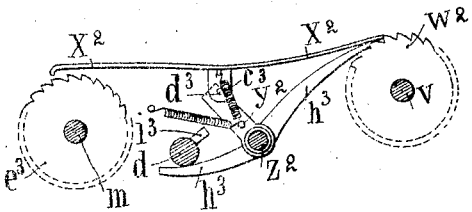
Fig. 10
Fig. 11
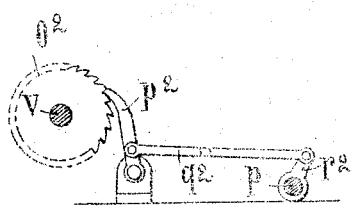
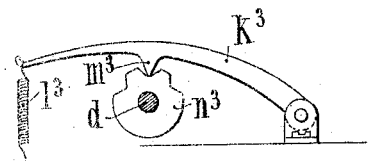
Fig. 16
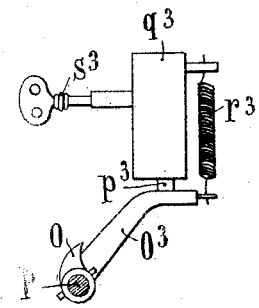
Witnesses:
C. M. Boulter
Inventor
René Picard
By Wm E Boulter
Attorney No. 886,244. PATENTED APR. 28, 1908.
R. PICARD.
FARE INDICATOR FOR CARRIAGES.
APPLICATION FILED NOV. 21, 1905.
3 SHEETS—SHEET 3.
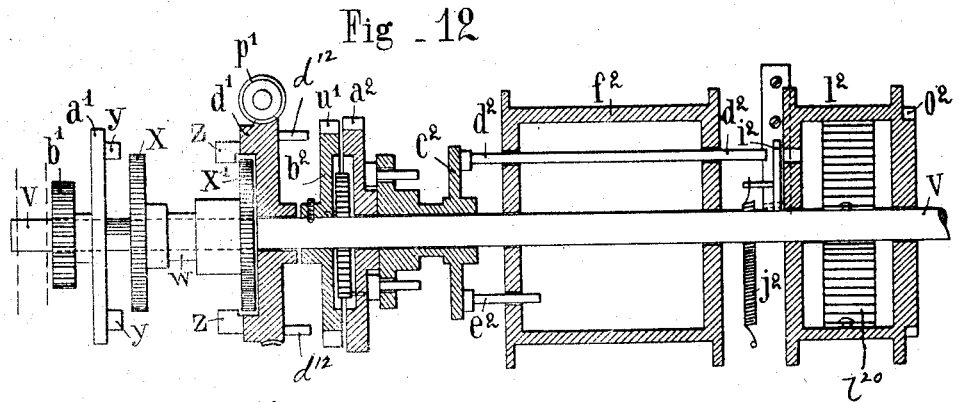
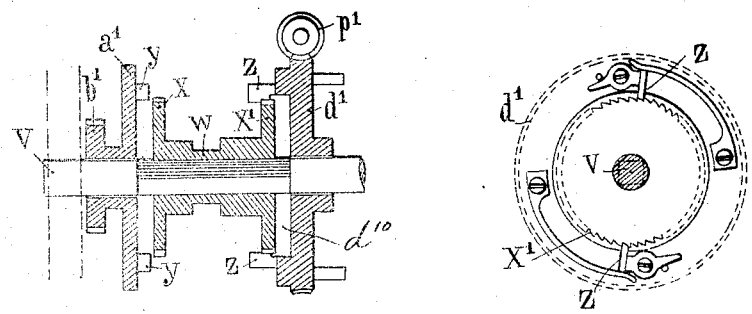 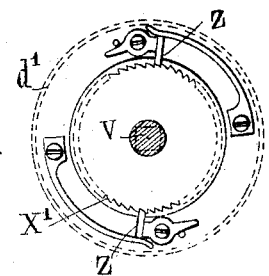
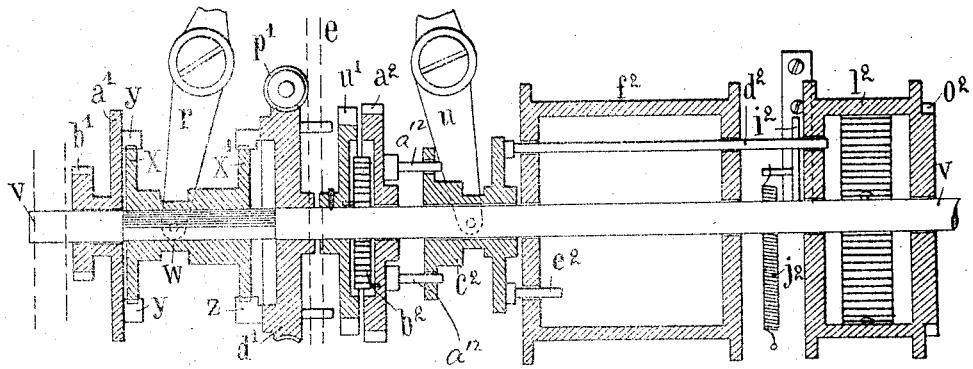

UNITED STATES PATENT OFFICE.

RENÉ PICARD, OF NEUILLY, SEINE, FRANCE.

FARE-INDICATOR FOR CARRIAGES.

No. 886,244.   Specification of Letters Patent.   Patented April 28, 1908.

Application filed November 21, 1905. Serial No. 288,387.

*To all whom it may concern:*

Be it known that I, RENÉ PICARD, a citizen of the Republic of France, and a resident of Neuilly, Seine, 3 Rue du Midi, France, have invented an Improvement in Fare-Indicators for Carriages, of which the following is a specification.

My invention relates to fare indicators, and among the objects in view is to provide a device of the character described adapted to indicate to a passenger the time consumed by the trip and the distance traveled and the amount to be paid accordingly.

A further object is to provide a device such as referred to which in the event of the vehicle traveling at less than the normal speed or being stopped during the trip, will operate to indicate the fare to be paid according solely to the time engaged.

According to this invention, therefore, a vehicle provided with the device and traveling at a certain normal rate of speed, the kilometric movement will indicate the sum to be paid, but when the vehicle makes a stop or stops, it will be the clock-work movement that will operate to indicate the amount to be paid, and this change of control will be effected automatically.

The invention consists in the novel construction, arrangement and combination of parts as hereinafter fully described, illustrated in the drawings and pointed out in the appended claim.

In the drawings:—Figure 1 is a plan view of the apparatus with the upper plate or cover removed. Fig. 2 is a front view of the apparatus. Fig. 3 is a detail view of the cylinder to which is attached the band indicating the amounts to be paid, and contiguous parts *i. e.*, pivoted arm, and the spring acting thereon, and the shaft supporting said cylinder. Fig. 4 is a detail view of the cylinder seen in Fig. 3, the band wound thereon, the band carrying the indications "Kilometric" "Horo-kilometric" and "Free", the guide rollers for the latter band, and the spring to which one end of the last mentioned band is attached. Fig. 5 is a detail view of the toothed wheel on the shaft actuated by the clockwork and the spring-actuated levers engaging said wheel, the escapement wheel and the escapement lever. Fig. 6 is a detail view of the helical cam on the hub of one of the rear wheels of a vehicle, the pinion engaged by said cam, the flexible shaft to which is secured the pinion shaft, and the hangers for the pinion shaft. Fig. 7 is a detail view showing the hand-operated shaft, the lever thereon with its pawl and actuating spring and the ratchet wheel engaged by said pawl, and the shaft supporting said ratchet wheel. Fig. 8 is a detail view showing the wheel having four lateral pins, the endless screw actuating said wheel, the lever which bears at one end on the pins, the spring actuating said lever, the pawl carried by said lever, the ratchet wheel engaged by the pawl, and other contiguous parts. Fig. 9 is a detail view of the ratchet wheel carried by the "supplements" cylinder, the lever engaging at one end with said ratchet wheel, the ratchet wheel which is engaged by the other end of said lever, the lever engaging the first ratchet wheel, and other contiguous parts. Fig. 10 is a detail view of the ratchet wheel on the cylinder seen in Fig. 4, the pawl engaging said wheel, and the lever connected with said pawl, and other contiguous parts. Fig. 11 is a detail view of the parts for determining the three positions for giving to the device the two controls for motion and that of rest. Fig. 12 is a sectional view, parts being in elevation, along the line of the shaft which is actuated by the clockwork. Fig. 13 is a sectional view of the parts at the left hand end of the shaft seen in Fig. 13. Fig. 14 is a detail view showing the ratchet wheel on the shaft seen in Fig. 12, and the pawls engaging with said ratchet wheel, and also in dotted lines the worm wheel which is actuated by the endless screw. Fig. 15 is a sectional view similar to Fig. 12 but showing the parts in a different position. Fig. 16 is a detail view of the parts for effecting the setting back to zero of the parts of the device. Fig. 17 shows by a side view and an end view a portion of the shaft which carries the hand-wheel, and one of the cams on said shaft, the said shaft being shown in section in the end view.

The mechanism is arranged within a casing A, the bottom plate $a$, of which serves as a support for the operative mechanism and the casing being closed at the front by a plate $b$, which is provided with means for indicating externally to the passenger the fare to be paid, the distance traveled, the time, etc.

Mounted within the casing is a shaft $d$, upon the projecting right hand end (as viewed in Figs. 1 and 2) of which is fixedly mounted a hand-wheel $c$, and upon the opposite end of which shaft is loosely mounted a lever $e$, to which is secured one end of a spiral spring $f$, whose opposite end is secured to a bar $f^{10}$, in the casing. Carried by the lever is a pawl $g$, the spring portion $h$, of which is secured to the lever and the throw of the pawl in one direction is limited by a pin $i$, on the lever. The pawl $g$, is adapted to engage with the teeth of a ratchet-wheel $k$, carried by a cylinder $l$, mounted on the shaft $m$, arranged parallel with shaft $d$.

Fixedly mounted on the shaft $d$, is a sleeve $j^{10}$, having a pin $j$, which, on the stoppage of the movement of the device, holds the pawl $g$, out of engagement with the ratchet-wheel $k$.

Upon the peripheral surface of the cylinder $l$ are marked a series of numbers arranged in arithmetical progression, the least number indicating the amount to be paid for a certain distance to be traveled. In the example shown, the minimum amount of fare to be paid is indicated as 0.75 francs (about $.15) to allow the apparatus to operate. The wheel $c$ is turned by hand to cause the pin $j$ to free the lever $e$, which, under the action of the spring $f$ is drawn downwardly and the pawl $g$ causes the wheel $k$ to turn a distance of one tooth; each of the teeth of this wheel $k$ corresponds to one of the numbers marked on the periphery of the cylinder $l$ and progressing by sums of fr. 0.75, represent the number of times the vehicle has been taken by passengers.

Within the cylinder is arranged a spring $n$ hooked at one end to the shaft $m$ and at the other end to the head of the cylinder in such a way that, by disengaging the pawl $g$ from the wheel $k$, and placing the wheel $c$ in the "free" position and by the release of the stop pawl $o$, engaging the ratchet-wheel $k$ and carried by the shaft $p$ mounted in the casing, the spring $n$, will operate to turn back the cylinder $l$ to zero.

On the shaft $d$ to the right of the sleeve $j^{10}$, is secured a cam $q$, the cam face of which, opposite the sleeve $j^{10}$, is adapted to give successively three positions to an oscillating lever $r$, one end of which latter is held in contact with the cam surface by a spring $s$ fixed to the plate $a$. A spring $t$ connects the lever $r$ to a similar oscillating lever $u$ described hereinafter. The levers $r$, $u$, are pivoted centrally to the plate $a$. The lever $r$, at the opposite end, is provided with a pin $r^{10}$ which engages in the groove of a sleeve $w$ mounted on a squared portion of a shaft $V$, which sleeve carries at opposite ends the toothed wheels $X$ and $X'$.

$c'$ indicates a clock-work which drives the shaft $V$, upon which shaft are loosely mounted a toothed wheel $b'$ and a sleeve $a'$ integral with each other, which sleeve $a'$ is provided upon one of its lateral faces with pawls $y$ which are pivoted to said sleeve. At the point where the wheel $b'$ and sleeve $a'$ are mounted upon the shaft, the latter is cylindrical.

$d'$ indicates a worm-wheel, which is loosely mounted on a cylindrical part of the shaft $V$, which worm-wheel carries pivoted pawls $z$.

When the apparatus is to be operated or controlled according to the time and distance (the horo-kilometric control), the lever $r$ will be shifted into the position indicated in Fig. 15, in which position the sleeve $w$ is moved to the left so that the wheel $X$ will be engaged by the pawls $y$ and the wheel $X'$ will be engaged by the pawls $z$. Thus the said wheels are locked together for simultaneous movement. When the lever $r$ is moved in the opposite direction so as to cause the wheel $X$ to be freed from the pawls $y$, the wheel $X'$ will still be in engagement with the pawls $z$, as seen in Fig. 13, in which position the parts are subject only to the kilometric control.

The wheel $d'$ is provided in its lateral face adjacent to the wheel $X'$ with a recess $d^{10}$ to receive the wheel $X'$ when the sleeve $W$ is moved still further to the right by the lever $r$, as seen in Fig. 12, in which latter position the parts will not be subject to either the clockwork or the kilometric control.

It will be noted that the pawls $z$ are of greater width than the pawls $y$ so that while the wheel $X$ will be free from the pawls $y$, the wheel $X'$ will still be in engagement with the pawls $z$, in the intermediate position seen in Fig. 13.

The wheel $d'$ carries on its face, opposite to the recess $d^{10}$, four pins $d^{12}$ projecting laterally, on which pins rests one end of a lever $e'$, the opposite end of which is loosely mounted upon a shaft $m$. The lever is held in engagement with the pins by a spiral spring $f''$ secured at one end to the plate $a$ and at the other end to the lever, and said lever carries a pawl $g$ pivoted thereto, said pawl having a shank portion $g^{10}$ carrying a pin $j'$ which engages within a slot $j^{12}$ formed in one end of an elbow lever $k'$, to the opposite end of which lever is pivoted a check-pawl $l'$.

The pawl $g'$ is adapted to engage with the teeth of a ratchet-wheel $h'$ so as to impart a step by step rotation to said wheel when the lever $e'$ is drawn downwardly under the action of the spring $f''$, and retrograde movement of said ratchet-wheel is prevented by the pawl $l'$ engaging with the teeth of said ratchet-wheel, said pawl $l'$ being held in engagement with the teeth by a spiral spring $m'$ attached at one end to the shaft $m$ and at the other end to the pawl $l'$.

The pawl $g'$ is held in engagement with the teeth of the ratchet-wheel by a spiral spring $i'$ attached at one end to the shank of said pawl and at the opposite end to the lever $e'$. The wheel $h'$ is carried by a cylinder $n'$ upon the peripheral surface of which are indicated kilometers and tenths of kilometers and said cylinder is provided interiorly with a spiral spring (not shown) arranged to turn said cylinder back to zero when the wheel $h'$ has been freed from the pawls $g'$ $l'$. With the wheel $d'$ engages an endless screw $p'$ actuated by one of the rear wheels of the vehicle, as follows:—

To the hub of one of the rear wheels of the vehicle, there is secured a cam $q'$ (Fig. 6) which engages in the teeth of a pinion $r'$ carried by a shaft $r^{12}$ mounted in bearings $S'$ carried by the axle. The shaft $r^{12}$ of the pinion $r'$, is secured to a flexible shaft $t'$ connected with the endless screw $p'$.

Whether the shaft $v$ is actuated by the clockwork or from the wheel of the vehicle, its rotation is always slow. On the shaft V alongside the wheel $d$ there is mounted a wheel $u'$ having 6 teeth with which engage two levers $V'$ united by a spiral spring $W'$ (Figs. 1 and 5); each of these levers carries a motion-transmitting pin $y'$ of an escapement Z arranged opposite an escapement-wheel $a^2$, which is loose on the shaft V, and, like the wheel $u'$, is recessed to form a space to receive the spring $b^2$ fixed at one end to the wheel $u'$ and at the other end to the escapement wheel $a^2$.

At each engagement of one of the levers $V''$ with the teeth of wheel $u'$, the wheel $a^2$ is disengaged and left to the action of the spring $b^2$, which pulls it rapidly a distance of one tooth. The wheel $a^2$ carries two pins $a^{12}$ upon which there can slide a sleeve $c^2$ loose on shaft V and having pins $d^2$ and $e^2$; the pin $d^2$ extends from end to end loosely through a cylinder $f^2$, loose on shaft V, and the pin $e^2$, which engages only in one end of this cylinder, serves simply as a guide in addition to the pin $d^2$.

Opposite the cylinder $f^2$ on the shaft $m$, there is loosely mounted a cylinder $g^2$ having an interior spring fixed at one end to the shaft $m$ and at the other end to the wall of the cylinder. On this cylinder $g^2$ there is wound a ribbon of fabric $h^2$, on which there are printed the amounts to be paid; this ribbon is attached to the cylinder $f^2$ and winds up on it in proportion to the action of the device and does this until the driver throws the device out of action.

The vehicle being free, that is the device being at rest, (as in Fig. 12), the pin $d^2$ is positioned a short distance from and opposite to a plate or arm $i^2$ subjected to the action of a spring $j^2$ secured to the plate $a$. On putting the device into operation (Fig. 15), the sleeve $c^2$ is pushed from the left to the right by the action of the cam $o'$ acting on the lever $u$ which causes the pin $d^2$ to strike against the plate or arm $i^2$ pivoted to the plate $a$; this plate prevents the pin $d^2$ from entering into the two first of the holes $k^2$ in the left-hand head of the cylinder $l^2$. The cylinder $l^2$ is provided internally with a spring $l^{20}$ which serves to rotate said cylinder, each partial rotation of the cylinder corresponds to a charge of, for instance, 10 centimes and the cylinder $l^2$ serves to control the movements of the cylinder $f^2$. On the cylinder $l^2$ there is wound a band of fabric $m^2$ on which there are printed numbers, increasing by 10 centimes and visible only at the rear of the mechanism. This band unwinds from the cylinder $l^2$ and winds up on a totalizing cylinder $n^2$ having an internal spring weaker than the spring within the cylinder $l^2$. On the side opposite to the arm $i^2$, the cylinder $l^2$ carries a ratchet-wheel $o^2$ with the teeth of which engages a pawl $p^2$ pivoted to the plate $a$ and joined by a rod $q^2$ by a finger $r^2$ rigidly connected to the shaft $p$ for setting back to zero.

$S^2$ indicates guide rollers mounted in bearing arms $S^{12}$ and over which rollers the band $h^2$ passes.

A flexible band $t^2$ carrying the indications "Kilometric", "Horo-kilometric" and "Free" passes over the guide rollers $u^2$ mounted in arms $S^{12}$. One end of the band $t^2$ is attached to one end of a spiral spring $t^{12}$ attached at the other end to the plate $a$ and the other end of the band is wound upon shaft $d$. Thus it will be seen that by reason of the position of the hand wheel and consequently the shaft $d$, the passenger will have indicated to him which character of control the device is operating under and according to which he is to pay, and will also have indicated to him if the device is at rest.

On the shaft V to the right of the cylinder $l^2$, is a cylinder $V^2$, called the "supplements" cylinder; this cylinder $V^2$ is loose on the shaft V although connected with that shaft by an internal spring for setting back.

To the cylinder $V^2$, there is secured a ratchet-wheel $W^2$ with the teeth of which engages a lever $X^2$ jointed to an arm $y^2$ rigidly connected to the rod or shaft $Z^2$ having an exterior manipulating lever $a^3$. The arm $y^2$ is constantly pressed towards the rear by a spring $b^3$ and the lever $X^2$ is connected to the arm $y^2$ by a spring $c^3$ which, by reason of the position of the pivotal point $d^3$ insures the contact of the lever $X^2$, either with the wheel $W^2$ or with a wheel $e^3$ rigidly connected with the totalizing "supplements" cylinder $f^3$ loosely mounted on the shaft $p$, which carries a pawl $g^3$ for holding the wheel $e^3$. This cylinder is also provided in the interior with a recoil spring, not shown. On the rod $Z^2$ next to the arm $y^2$, is fixed a two-armed lever $h^3$, one arm of which engages in the teeth of the wheel $W^2$ and serves as a retaining pawl, when, after having caused the wheel to advance one tooth, the lever $X^2$ operates to engage the next tooth. This same arm serves also to raise the lever $X^2$ when the driver brings back the handwheel $c$ and its shaft $d$ to the "free" position; this result is obtained by an arm $i^3$ fixed to the shaft $d$, which rests on the lower arm of the lever $h^3$ that oscillates and completely disengages the wheel $W^2$, which, under the action of its interior spring, returns to zero. A spring $j^3$ fixed to the plate $a$ and to the pawl $g^3$ causes this latter to remain engaged with the wheel $e^3$ until some one actuates the shaft $p$ for setting back to zero.

The three positions for giving to the shaft $d$ the two controls for motion and that of rest of the device, are determined by the lever $k^3$ pivoted to the plate $a$ and constantly drawn towards this latter by a spring $l^3$; this lever has a tooth $m^3$ that rests on a cam $n^3$ having three notches $n^{13}$ that correspond to the three controls.

The setting back to zero of the parts $l$, $n'$, $n^2$ and $f^3$, is effected by an oscillating movement of the shaft $p$ which actuates the corresponding retaining pawls $l$, $o'$, $p^2$ and $q^3$; this oscillating movement is obtained by a lever $o^3$ constantly pressed against the bolt $p^3$ of a lock $q^3$ by a spring $r^3$. The bolt being withdrawn into the interior of the lock by means of the key $s^3$, the lever $o^3$ oscillates in the direction for the disengagement of the pawls and the control cylinders thus liberated, resume their position at zero under the influence of their interior springs. Before describing the operation of the device, it will be remarked that a single hole $k^3$ would be sufficient for the cylinder $l^2$ to be carried along by the spindle $d^2$; it is only to facilitate the mounting of these parts and the interior spring that the entire circumference traced by the spindle or pin has been perforated.

The band $h^2$ that indicates the amount to be paid, is provided with the indication fr. 0.75 which occurs three times in succession, the first indication 0.75 being for the first engagement of the vehicle, the second indication 0.75 for the first 400 meters traversed, and the third indication 0.75 for the second distance of 400 meters (that is 800 meters); at this moment the engagement of the pin $d^2$ with the cylinder $l^2$ is effected under the constant effort of the spring $t$, and the first tax of 10 centimes will be indicated only after the traversing of 400 additional meters, that is to say at the 1200th meter.

In case the road traversed by the vehicle is long enough to cause the pin $d^2$ to make a revolution, said pin would again encounter the arm $i^2$ which, being held only by its spring, would recoil under the pressure of the pin and resume its position after its passage.

In operation, the device being at the position "free" and the indicating cylinders at zero, if I cause the handwheel $c$, to describe about 1/6th of a revolution in the direction of the arrow, I actuate simultaneously the cylinders $l$ and $f^2$ which indicate fr. 0.75 for the engagement of the vehicle and the operation is made kilometrically by the engagement of the wheel X' with the pawl Z engaging the wheel $d'$ actuated by the screw $p'$ which receives its movement from one of the rear wheels of the vehicle. At the 1200th meter, the band $h^2$ indicates an increase of 10 centimes which is indicated on the cylinder $n^2$. In the case of supplementary fees to be charged, as for baggage, the driver actuates the lever $a^3$ which causes the cylinder $V^2$ and $f^2$ to indicate as many times fr. 0,75 as there are additions or supplements to be charged.

If I cause the handwheel $c$ to make a further 1/6th of a revolution, the wheel X will be engaged with the plate $a'$, depending on the clockwork and the wheel X' will remain engaged with the wheel $d'$. The double engagement being affected, if the vehicle proceeds at normal speed, it is the wheel X, which will carry along the shaft V and, if this speed falls below the normal or the vehicle stops, the clockwork will actuate the shaft V and the indicating cylinders. The vehicle becoming free again, the driver brings back the handwheel to its point of beginning, which effects the disengagement of the wheels X and X' and brings back the cylinders $f^2$ and $V^2$ to zero and the indicating band $t^2$ to the indication "free." During the successive operations of the device, the indicating cylinders have progressed and indicate respectively the hirings of the vehicles, the kilometers traversed, the total additional taxes of 10 centimes and the total of the supplementary charges; then at the office these results are noted and by a key $s^3$ we disengage simultaneously all the retaining pawls of the indicating cylinders which are brought back to zero by their interior springs.

What I claim is:—

1. In an apparatus of the character described the combination with a rotatable shaft and a collar thereon having a pin, of a spring-controlled lever mounted loosely on said shaft and provided with a pawl and with which lever the said pin is adapted to come in contact, a ratchet wheel with the teeth of which the pawl is adapted to engage, a cylinder carrying said ratchet wheel and provided with numerical indications, and a shaft upon which said cylinder is mounted, all arranged for coöperation as described.

2. In an apparatus of the character described the combination with a rotatable shaft and a collar thereon having a pin, of a spring-controlled lever mounted loosely on said shaft and provided with a pawl and with which lever the said pin is adapted to come in contact, a ratchet wheel with the teeth of which the pawl is adapted to engage, a cylinder carrying said ratchet wheel and provided with numerical indications, a shaft upon which said cylinder is mounted, a stop pawl adapted to engage the teeth of the ratchet wheel and a spring within said cylinder and adapted to act thereon to turn the same reversely in the manner described.

3. The combination with a rotatable shaft, of two cams secured to said shaft and the face of each of which is constructed as described, spring-pressed oscillatable levers, one end of each of which bears upon one of the cam faces whereby said levers will be given different positions by the cams, a clockwork, a shaft V driven by the latter, a grooved sleeve slidably mounted on a square portion of the latter shaft, a pin on one of the said levers and engaging in the groove of the sleeve, toothed wheels X X' carried by said sleeve, an integral toothed wheel and a sleeve loosely mounted on the shaft V, pawls on the last mentioned sleeve adapted to engage the teeth of wheel X, a worm wheel loosely mounted on the shaft V, pawls on said worm wheel adapted to engage the teeth of wheel X' and adapted in the intermediate position of the oscillatable levers to remain in engagement with wheel X' when the wheel X is freed from its engaging pawls, means for actuating the worm wheel from a vehicle wheel, a rotatable cylinder having distance indications upon its periphery, means for imparting step by step rotation to said cylinder from the worm wheel, and a spring adapted to turn the said cylinder back to zero, as set forth.

4. The combination with the worm wheel $d'$ and an endless screw engaging the same, of means for rotating the said screw comprising a helical cam, a pinion adapted to be carried by the vehicle axle and engaged by the said cam and a shaft carrying said pinion and a flexible shaft connecting the latter shaft and the endless screw.

5. The combination with the worm wheel $d'$ and means for rotating same, of laterally-projecting pins carried thereby, a spring actuated lever having one end adapted to rest on said pins successively, a pawl on said lever, a pin on said pawl, a lever $k'$ having a slot in which the pin on the pawl engages, a ratchet wheel engaged by the pawl, and a cylinder $n'$ carrying said ratchet wheel.

6. The combination with a rotatable shaft V, of a cylinder $f^2$ mounted thereon, a cylinder $g^2$ arranged opposite the cylinder $f^2$, a band carried by the cylinder $g^2$ and adapted to wind upon the cylinder $f^2$, a cylinder $l^2$ loose on shaft V, means for effecting the coupling together of the cylinders $f^2$ and $l^2$, a cylinder $n^2$ and a band carried by cylinder $l^2$ and adapted to wind upon the cylinder $n^2$.

7. The combination with the cylinder $l^1$ and a spring arranged to reversely turn the cylinder, of a ratchet wheel carried by said cylinder, a pawl engaging the teeth of said ratchet wheel, a rod connected at one end to said pawl, an oscillatable shaft $p$, a connection between the latter and the said rod, and means for oscillating the shaft $p$.

8. In an apparatus of the character described, the combination with a rotatable shaft, a lever mounted loosely on said shaft and a pawl carried by said lever, of a rotatable cylinder provided upon its peripheral surface with numerical indications and means intermediate said cylinder and lever whereby the cylinder will be partially rotated when the said shaft is turned.

9. The combination with a rotatable shaft, of a cylinder $f^2$ mounted thereon, a cylinder $g^2$ arranged opposite the cylinder $f^2$, a band on cylinder $g^2$ adapted to wind upon the cylinder $f^2$, a cylinder $l^2$ loose on the said shaft, a cylinder $n^2$ and a band carried by cylinder $l^2$ and adapted to wind upon cylinder $n^2$ and means for effecting the coupling together of cylinders $f^2$ and $l^2$ comprising a sleeve slidingly mounted on the said shaft and having a laterally projecting pin extending loosely through cylinder $f^2$ and adapted to enter holes in the cylinder $l^2$, and means for sliding the said sleeve on the shaft.

10. The combination with a rotatable shaft, of a cylinder $f^2$ mounted thereon, a cylinder $g^2$ arranged opposite the cylinder $f^2$, a band on the cylinder $g^2$ adapted to wind upon the cylinder $f^2$, a cylinder $l^2$ loose on the said shaft, a cylinder $n^2$ and a band carried by cylinder $l^2$ and adapted to wind upon cylinder $n^2$, means for effecting the coupling together of cylinders $f^2$ and $l^2$ comprising a sleeve slidingly mounted on the said shaft and having a laterally projecting pin, extending loosely through the cylinder $f^2$ and adapted to enter holes in the cylinder $l^2$, and means for sliding the said sleeve on the shaft, and a pivotally-arranged arm adapted to be temporarily positioned in line with the laterally-projecting pin to prevent the latter from entering certain of the holes in the cylinder $l^2$.

11. The combination with a rotatable cylinder $V^2$ provided with numerical indications as described, of a rotatable cylinder $f^3$ mounted opposite the cylinder $V^2$ and provided with numerical indications, a shaft adapted to be partially rotated by band and means intermediate said shaft and the said cylinders for effecting a step-by-step rotation of said cylinders.

12. The combination with a rotatable cylinder $V^2$ provided with numerical indications as described, a ratchet wheel secured thereto, a rotatable cylinder $f^3$ mounted opposite the cylinder $V^2$ and a ratchet wheel secured to the cylinder $f^3$, of a lever arranged to engage the said ratchet wheels, a rotatable shaft, and means intermediate the latter and the said lever to operate the latter to effect step-by-step rotation of the said cylinders.

13. The combination with a rotatable cylinder $V^2$ provided with numerical indications as described, a ratchet wheel secured thereto, a rotatable cylinder $f^3$ and a ratchet wheel secured to the cylinder $f^3$, of a lever arranged to engage the said ratchet wheels, a rotatable shaft, and means intermediate the latter and the said lever to operate the latter to effect step-by-step rotation of the said cylinders, comprising an arm secured to said shaft and to which arm said lever is pivoted, a spring attached to the lever and arm, and a spring connected with the arm and acting to draw the same in one direction.

14. The combination with a rotatable cylinder $V^2$ provided with numerical indications as described, a ratchet wheel secured thereto, a rotatable cylinder $f^3$ and a ratchet wheel secured to the cylinder $f^3$, of a lever arranged to engage the said ratchet wheels, a rotatable shaft, and means intermediate the latter and the said lever to operate the latter to effect step-by-step rotation of the said cylinders, and means for throwing the said lever out of engagement with the said ratchet wheel on cylinder $V^2$.

15. The combination with a rotatable cylinder $V^2$ provided with numerical indications as described, a ratchet wheel secured thereto, a rotatable cylinder $f^3$ and a ratchet wheel secured to the cylinder $f^3$, of a lever arranged to engage the said ratchet wheels, a rotatable shaft, and means intermediate the latter and the said lever to operate the latter to effect step-by-step rotation of the said cylinders, and means for throwing the said lever out of engagement with the ratchet wheel on cylinder $V^2$ comprising a two-armed lever loosely mounted on said shaft having one of its arms arranged to be brought to bear upon the first-mentioned lever, a rotatable shaft $d$, and an arm thereon adapted to actuate the other arm of the two-armed lever, and a spring arranged to turn the cylinder $V^2$ reversely for the purpose specified.

In testimony whereof I affix my signature in presence of two witnesses.

RENÉ PICARD.

Witnesses:
  HANSON C. COXE,
  VICTOR MATRAIX.